Patented Sept. 30, 1952

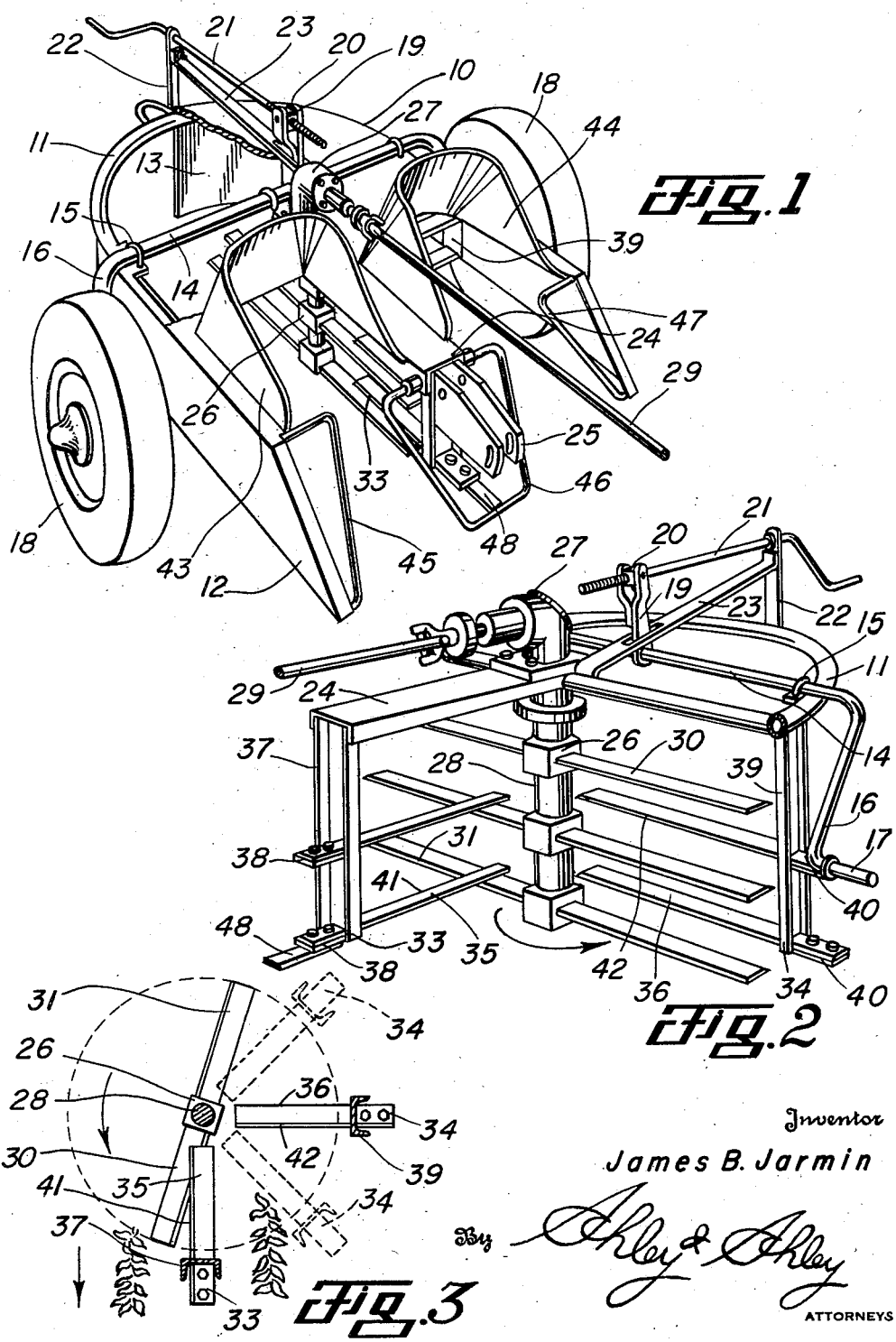

2,612,017

UNITED STATES PATENT OFFICE 2,612,017

STALK SHREDDER

James B. Jarmin, Dallas, Tex., assignor to Servis Equipment Company, Dallas, Tex., a corporation of Texas Application July 13, 1950, Serial No. 173,495

10 Claims. (Cl. 55—62)

This invention relates to new and useful improvements in stalk shredders.

One object of the invention is to provide an improved stalk shredder which is particularly adapted for use with row crops and which is so constructed that standing stalks in adjacent rows may be cut simultaneously into small pieces for turning under and enrichment of the soil.

Another object of the invention is to provide an improved stalk shredder having fixed or stationary cutters arranged angularly to each other for coacting with a rotary cutter so as to simultaneously cut the stalks of crops in adjacent rows.

A further object of the invention is to provide an improved stalk shredder, of the character described, wherein a pair of fixed cutting blades extend laterally of and forwardly of a rotary cutting blade in superimposed relation to its path of rotation whereby the stalks of a row are cut against one of the fixed blades and the stalks of an adjacent row are cut against the other fixed blade by said rotating blade.

Still another object of the invention is to provide an improved stalk shredder, of the character described, wherein the stationary blades are arranged in sets extending transversely of and substantially in the direction of travel of the shredder for coacting with a single set of rotary blades, the positions of said stationary blades preferably being normal to and parallel to said direction of travel but being variable so long as said blades act upon the stalks of adjacent rows.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a perspective view of a stalk shredder constructed in accordance with the invention, Fig. 2 is an enlarged, perspective view of the blades of the shredder and their mounting, and Fig. 3 is a horizontal, cross-sectional view, showing the relation of the blades to row crops.

In the drawing, the numeral 10 designates the body or housing of a stalk shredder which includes a substantially U-shaped, horizontal frame 11 having its top, sides and curved rear end enclosed by sheet metal 12. The front end of the housing 10 is open and, if desired, a discharge opening 13 may be formed in the rear end of said housing. A transverse axle 14 overlies the top of the housing, being secured thereto by suitable shackle bolts 15, and has its end portions bent upon themselves to provide depending legs 16 and outwardly-projecting spindles 17 for receiving ground support wheels 18. The elevation of the housing relative to the ground is adapted to be adjusted by rocking the axle 14 about its axis so as to swing the legs 16 and raise and lower the wheels 18. A clevis 19 is carried by the intermediate portion of the axle and has pivotal connection with a nut 20 which is screw-threaded upon an adjusting rod 21 in the form of a crank. The rod 21 extends longitudinally of the housing and is journaled in the upper end of an arm 22 projecting upwardly from the rear end of said housing. Due to this arrangement, rotation of the rod swings the clevis 19 to rock the axle about its axis. A reinforcing member or brace 23 may extend from the intermediate portion of the housing to the arm 22.

The frame 11 includes a central, horizontal channel or other member 24 extending longitudinally of said frame and having a suitable hitch 25 secured thereto for connection with a tractor (not shown) in the usual manner of pull-type implements. A power-driven rotary cutter 26 is supported by the rear portion of the channel 24 at the central portion of the housing and includes a right-angle gear box 27 having a depending, substantially vertical shaft 28. The gear box 27 is adapted to be connected to the power take-off of the tractor by a suitable shaft 29. A plurality or set of horizontal, radial elements or blades 30, three blades being illustrated, are mounted on the shaft 28 in spaced, parallel relation and vertical alinement. Each blade 30 is disposed diametrically of the shaft and has its leading or counter-clockwise edge portions bevelled or sharpened to provide cutting edges 31.

Complementary, stationary or fixed cutters 33 and 34 are provided for coacting with the rotary cutter 26 and includes a longitudinally or forwardly extending set or pair of horizontal cutter elements or blades 35 and a lateral or transversely-extending set or pair of horizontal cutter elements or blades 36. The blades 35 and 36 are disposed in spaced, parallel relation and intersect the path of rotation of the rotary cutter so as to extend in superimposed relation to the paths of rotation of the blades 30. An upright channel or other member 37 depends from the forward end of the channel 24 for supporting the cutter 33 and is slotted transversely for receiving the blades 35. A horizontal lug or plate 38 is secured beneath each slot and the outer ends of the blades are bolted thereto so as to be removable for repair or replacement. The cutter 34 is supported by a similar slotted channel or member 39, having horizontal lugs or plates 40, which depends from one side of the frame. Since the rotary cutter is driven in a counter-clockwise direction, the cutter 34 is disposed to the right of said rotary cutter and the left-hand or clockwise edge portions of the blades 35 and 36 are bevelled or sharpened to provide cutting edges 41 and 42, respectively.

For directing standing stalks or plants into the path of rotation of the cutter 26, a pair of openings are formed in the top of the housing at its forward end on either side of its central channel 24. U-shaped, rearwardly-directed shields 43 and 44 project upwardly from the openings in overlying relation to the path of the rotary cutter. Suitable guide or confining members 45, 46 and 47, in the form of transversely-extending, angular rods, are secured to the sides and center of the housing forward end and project into the openings below the shields 43 and 44. The center member 46 is substantially U-shaped and depends from the channel 24 so as to project into both openings. A brace 48 extends forwardly from the lower plate 38 of the upright channel 37 for supporting the lower end of the member 46. Manifestly, the shields and members coact to direct and confine stalks or plants to the left of the fixed cutter 33 and forwardly of the fixed cutter 34 whereby the stalks or plants are cut into small pieces or lengths against said fixed cutters by rotation of the cutter 26. The opening 13 at the rear end of the housing permits discharge of the cut pieces.

Although the fixed cutters 33 and 34 preferably are disposed in approximate right angular relation to each other with the longitudinal axes of their blades intersecting the axis of the rotary cutter, it is pointed out that the exact positions of said cutters are not critical and are subject to variation. As shown by the dotted lines in Fig. 3, the position of the lateral cutter may be varied through an angle of 90° whereby said cutter may extend from an angle of 45° to 135° relative to the longitudinal cutter. Also, the position of the latter cutter may be varied to a more limited extent. In order to efficiently shred or cut stalks in small pieces, it is essential that the fixed cutters be so positioned that said stalks are forced into engagement with and cut against said cutters by the rotary cutter. Due to the angular relation and positions of the fixed cutters, it is readily apparent that the stalks of adjacent row crops may be cut simultaneously by a single rotary cutter.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A stalk shredder for simultaneously cutting the standing stalks of adjacent row crops including, a frame, a pair of substantially horizontal blades fixed to the frame and disposed in spaced, angular relation, and a substantially horizontal driven blade rotatably mounted on said frame adjacent the fixed blades whereby its path of rotation and said blades are in superimposed relation, one of the fixed blades extending approximately in the direction of movement of the shredder and the other blade extending approximately transverse of such movement whereby said fixed blades coact with the driven blade upon stalks in adjacent rows.

2. A stalk shredder for simultaneously cutting the standing stalks of adjacent row crops including, a mobile frame, a driven blade mounted on the frame so as to be rotatable about an upright axis, and a pair of blades fixed to said frame in substantially parallel and superimposed relation to its path of rotation, one of the fixed blades extending forwardly of the axis of said driven blade and the other blade extending transversely of said axis, whereby the stalks of a row are forced into engagement with one fixed blade and the stalks of an adjacent row are forced into engagement with the other fixed blade and cut thereagainst by rotation of said driven blade.

3. A stalk shredder as set forth in claim 2 wherein the fixed blades are disposed in spaced, approximate right angular relation to each other with their longitudinal axes substantially intersecting the axis of the driven blade.

4. A stalk shredder including, a mobile frame, an upright driven shaft supported by the frame, radial cutters mounted on the shaft so as to rotate therewith, and fixed cutters mounted on said frame in superimposed relation to the paths of rotation of the radial cutters, the fixed cutters being disposed in sets for coacting with said radial cutters to cut the standing stalks of row crops, one set of fixed cutters extending substantially in the direction of travel of the shredder and other set of fixed cutters extending transversely of said direction of travel, whereby the stalks of one row are cut against one set of fixed cutters and the stalks of an adjacent row are cut against the other set of fixed cutters by rotation of said radial cutters.

5. A stalk shredder as set forth in claim 4 wherein the radial cutters and the fixed cutters of each set are in upright alinement.

6. A stalk shredder as set forth in claim 4 wherein each radial cutter includes a blade extending diametrically of the driven shaft, the fixed cutters of each set including blades disposed in substantially parallel relation to the blades of the radial cutters.

7. A stalk shredder as set forth in claim 4 wherein the sets of fixed cutters are disposed in substantially right angular relation to each other.

8. A stalk shredder as set forth in claim 4 wherein the radial cutters include alined blades extending diametrically of the shaft, the fixed cutters of each set including alined blades in substantially parallel relation to the blades of the radial cutters.

9. A stalk shredder for simultaneously cutting the standing stalks of adjacent row crops including, a frame, a pair of substantially horizontal blades fixed to the frame and disposed in spaced, angular relation, and a substantially horizontal driven blade rotatably mounted on said frame adjacent the fixed blades whereby its path of rotation and said blades are in superimposed relation, one of the fixed blades extending approximately in the direction of movement of the shredder and the other blade extending approximately transverse of such movement whereby said fixed blades coact with the driven blade upon stalks in adjacent rows, said transverse blade being disposed at an acute angle to the other fixed blade.

10. A stalk shredder for simultaneously cutting the standing stalks of adjacent row crops including, a frame, a pair of substantially horizontal blades fixed to the frame and disposed in spaced, angular relation, and a substantially horizontal driven blade rotatably mounted on said frame adjacent the fixed blades whereby its path of rotation and said blades are in superimposed relation, one of the fixed blades extending approximately in the direction of movement of the shredder and the other blade extending approximately transverse of such movement whereby said fixed blades coact with the driven blade upon stalks in adjacent rows, said transverse blade being disposed at an obtuse angle to the other fixed blade.

JAMES B. JARMIN.

REFERENCES CITED

The following references are of record in the file of this patent:

UNITED STATES PATENTS

| Number | Name | Date |
| --- | --- | --- |
| 13,538 | Bocage | Sept. 11, 1855 |
| 1,782,560 | Benjamin | Nov. 25, 1930 |